US008965867B2

(12) United States Patent
Mehta et al.

(10) Patent No.: US 8,965,867 B2
(45) Date of Patent: Feb. 24, 2015

(54) MEASURING AND ALTERING TOPIC INFLUENCE ON EDITED AND UNEDITED MEDIA

(71) Applicant: International Business Machines Corporation, Armonk, NY (US)

(72) Inventors: Sameep Mehta, New Delhi (IN); Mrinmaya Sachan, Kanpur (IN); Nisanth M. Simon, Kerala (IN); L. Venkata Subramaniam, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/690,218

(22) Filed: Nov. 30, 2012

(65) Prior Publication Data

US 2014/0156673 A1 Jun. 5, 2014

(51) Int. Cl.
G06F 17/30 (2006.01)
H04L 29/08 (2006.01)

(52) U.S. Cl.
CPC .............................. H04L 29/08099 (2013.01)
USPC ........................................ 707/705; 707/748

(58) Field of Classification Search
USPC ................................................. 707/705, 748
See application file for complete search history.

(56) References Cited

U.S. PATENT DOCUMENTS

| 7,020,652 | B2 * | 3/2006 | Matz et al. | 707/752 |
|---|---|---|---|---|
| 7,725,467 | B2 * | 5/2010 | Yamamoto et al. | 707/736 |
| 8,099,407 | B2 * | 1/2012 | Auerbach et al. | 707/709 |
| 8,230,343 | B2 * | 7/2012 | Logan et al. | 715/723 |
| 8,600,830 | B2 * | 12/2013 | Hoffberg | 705/26.3 |
| 8,626,739 | B2 * | 1/2014 | Auerbach et al. | 707/709 |
| 8,630,972 | B2 * | 1/2014 | Gamon et al. | 706/58 |
| 8,856,841 | B2 * | 10/2014 | Swix et al. | 725/81 |
| 2009/0048904 | A1 | 2/2009 | Newton et al. | |
| 2010/0119053 | A1 | 5/2010 | Goeldi | |
| 2010/0153329 | A1 | 6/2010 | Ghosh et al. | |
| 2011/0314396 | A1 * | 12/2011 | Diab et al. | 715/760 |
| 2012/0117059 | A1 | 5/2012 | Bailey et al. | |
| 2012/0239651 | A1 * | 9/2012 | Nealer et al. | 707/737 |

OTHER PUBLICATIONS

Hui, Peter et al., "Quantifying Sentiment and Influence in Blogspaces," 1st Workshop on Social Media Analytics (SOMA '10), Washington, DC, USA, Jul. 25, 2010, 9 pages, ACM Digital Library.
Cha, Meeyoung et al., "Measuring User Influence in Twitter: The Million Follower Fallacy," Proceedings of the Fourth International AAAI Conference on Weblogs and Social Media, Washington, DC, USA, May 23-26, 2010, pp. 10-17, The AAAI Press, Menlo Park, California, USA.
IPCOM, "A Method and Apparatus of Ranking on Sentiment Evidence," Prior Art Dababase Disclosure, Dec. 30, 2009, 1 page, Prior Art Database.

(Continued)

*Primary Examiner* — Kim Nguyen

(74) *Attorney, Agent, or Firm* — Ference & Associates LLC

(57) ABSTRACT

Methods and arrangements for measuring and utilizing media topic influence. A publically disseminated media transmission is received. Public influence of the media transmission is measured via: identifying one or more media sources used to disseminate the media transmission; and obtaining one or more predetermined influence values associated with the one or more media sources.

11 Claims, 13 Drawing Sheets

(56) References Cited

OTHER PUBLICATIONS

Marcus, Adam et al., "TwitInfo: Aggregating and Visualizing Microblogs for Event Exploration," CHI 2011, Vancouver, British Columbia, Canada, May 7-12, 2011, 10 pages, ACM Digital Library.
Bakshy, Eytan, et al., "The Role of Social Networks in Information Diffusion," WWW 2012, Lyon, France, Apr. 16-20, 2012, 10 pages, ACM Digital Library.
Yang, Jaewon et al., "Modeling Information Diffusion in Implicit Networks," Proceedings of the 2010 IEEE International Conference on Data Mining, Sydney, Australia, Dec. 14-17, 2010, 11 pages. Available at http://cs.stanford.edu/~jure/pubs/lim-icdm10.pdf as of Nov. 19, 2012.
Gruhl, Daniel et al., "Information Diffusion Through Blogspace," Proceedings of the 13th International World Wide Web Conference (WWW '04), May 2004, 24 pages, ACM, New York, New York, USA.
Kempe, David et al., "Influential Nodes in a Diffusion Model for Social Networks," Proceedings of the 32nd International Conference on Automata, Languages and Programming, ICALP '05, 2005, 12 pages, Springer-Verlag, Berlin, Germany. Available at http://www.cs.cornell.edu/home/kleinber/icalp05-inf.pdf as of Nov. 19, 2012.
Kempe, David et al., "Maximizing the Spread of Influence through a Social Network," SIGKDD '03, Washington, DC. USA, 2003, 10 pages, ACM Digital Library.
Anagnostopoulos, Aris et al., "Influence and Correlation in Social Networks," KDD '08, Las Vegas, Nevada, USA, Aug. 24-27, 2008, 9 pages, ACM Digital Library.
Weng, Jianshu et al., "TwitterRank, Finding Topic-sensitive Influential Twitterers," WSDM '10, New York, New York, USA, Feb. 4-6, 2010, 10 pages, ACM Digital Library.
Agarwal, Nitin et al., "Identifying the Influential Bloggers in a Community," WSDM '08, Palo Alto, California, USA, Feb. 11-12, 2008, 11 pages, ACM Digital Library.
Bakshy, Eytan et al., "Everyone's an Influencer: Quantifying Influence on Twitter," WSDM '11, Hong Kong, China, Feb. 9-12, 2011, 10 pages, ACM Digital Library.
Bakshy, Eytan et al., "Social Influence and the Diffusion of User-Created Content," EC '09, Stanford, California, USA, Jul. 6-10, 2009, 10 pages, ACM Digital Library.
Sun, Eric, et al., "Gesundheitt Modeling Contagion through Facebook News Feed," Third International AAAI Conference on Weblogs and Social Media, San Jose, California, USA, May 17-20, 2009, 8 pages, Association for the Advancement of Artificial Intelligence, Palo Alto, California, USA.

* cited by examiner

MEASURING AND ALTERING TOPIC INFLUENCE ON EDITED AND UNEDITED MEDIA

BACKGROUND

Generally, the total number of social media accounts has come to exceed the global population, and almost all sectors of the population are represented. Social media channels today carry discussions on every topic, and it can be appreciated that by monitoring social media channels it is possible to capture topics and sentiments on these topics. More particularly, in a non-intrusive manner, it becomes possible to understand and appreciate how topics are developing over time and space.

For their part, news websites trigger topics that may be picked by social media at a later point of time. Particularly, people tend to comment on news reports, recommend them to others and/or pass URLs within social media. For regions with newspaper circulation, this can provide much wider reach. However, inasmuch as there are multiple news websites in a region, it may prove challenging to easily pinpoint or obtain the best such sites for a region.

BRIEF SUMMARY

In summary, one aspect of the method provides a method for measuring and altering media topic influence, said method comprising: utilizing a processor to execute computer code configured to perform the steps of: receiving a publically disseminated media transmission; and measuring public influence of the media transmission via: identifying one or more media sources used to disseminate the media transmission; and obtaining one or more predetermined influence values associated with the one or more media sources.

Another aspect of the invention provides an apparatus comprising: at least one processor; and a computer readable storage medium having computer readable program code embodied therewith and executable by the at least one processor, the computer readable program code comprising: computer readable program code configured to receive a publically disseminated media transmission; and computer readable program code configured to measure public influence of the media transmission via: identifying one or more media sources used to disseminate the media transmission; and obtaining one or more predetermined influence values associated with the one or more media sources.

An additional aspect of the invention provides a computer program product comprising: a computer readable storage medium having computer readable program code embodied therewith, the computer readable program code comprising: computer readable program code configured to receive a publically disseminated media transmission; and computer readable program code configured to measure public influence of the media transmission via: identifying one or more media sources used to disseminate the media transmission; and obtaining one or more predetermined influence values associated with the one or more media sources.

A further aspect of the invention provides a method for measuring and altering media topic influence, said method comprising: utilizing a processor to execute computer code configured to perform the steps of: receiving a publically disseminated media transmission; identifying a topic in the media transmission; determining subtopics related to the topic; and measuring public influence of the topic and subtopics.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
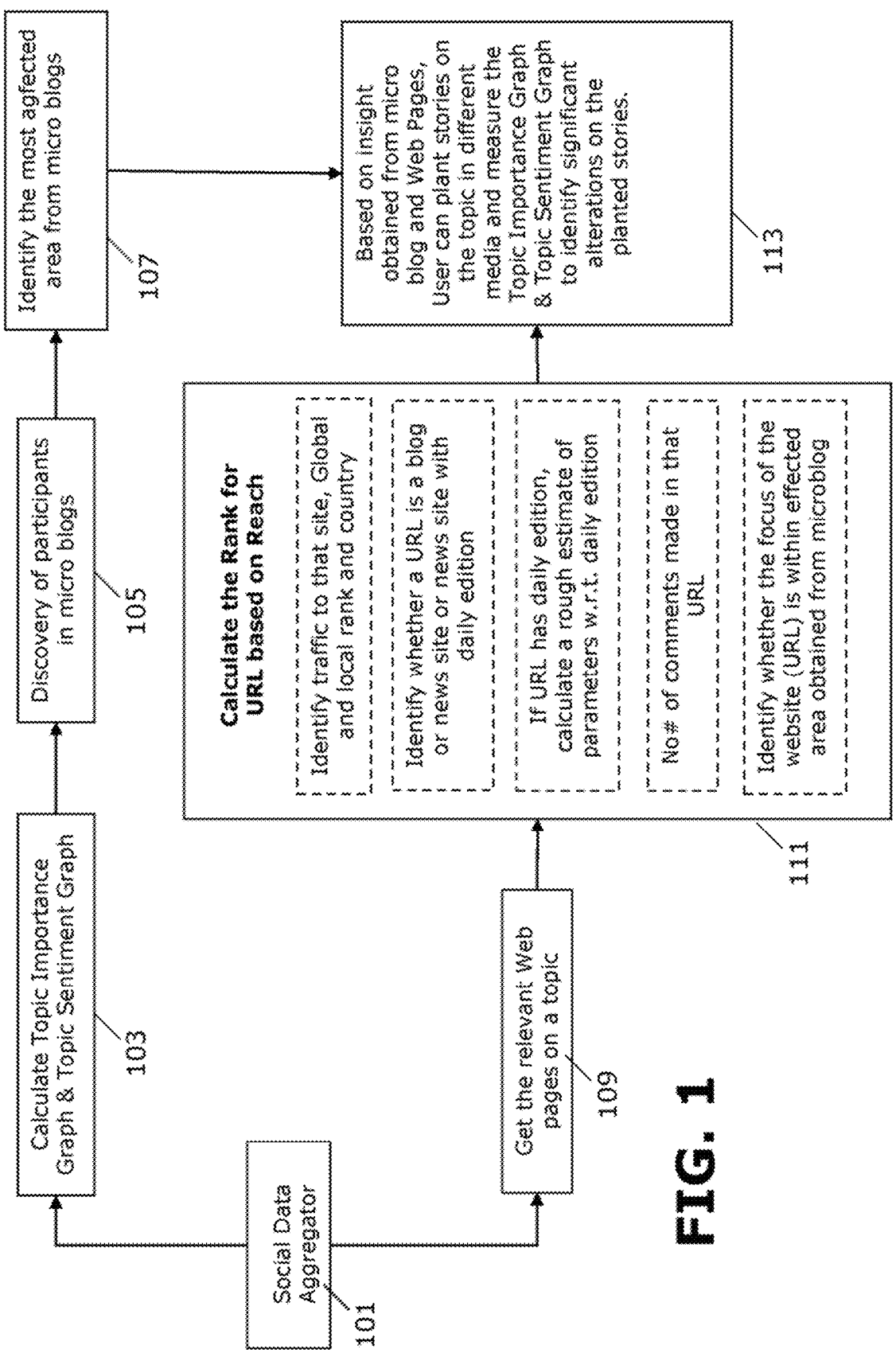
FIG. 1 schematically illustrates a high-level process flow.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made hereinbelow to FIGS. 1-11. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 13. In accordance with an example embodiment, most if not all of the process steps, components and outputs discussed with respect to FIGS. 1-11 can be performed or utilized by way of a processing unit or units and system memory such as those indicated, respectively, at 16' and 28' in FIG. 13, whether on a server computer, a client computer, a node computer in a distributed network, or any combination thereof In accordance with at least one embodiment of the invention, arrangements are provided for assimilating information relating to topic development in all available news media and social media, with respect to different facets, in a manner that permits: targeting customers in a medium based on relevant topics; targeting an appropriate media channel or avenue based on topic popularity; and planting a story and thereby seeking to influence the mood with regard to a topic, and to do so in an effective manner.

In accordance with at least one embodiment of the invention, there is broadly contemplated herein a method of measuring the influence of a topic as a function of time, location, medium and actors. The influence is measured based on importance and sentiment around a topic and its various sub-topics. There is also broadly contemplated herein a manner of employing this method to influence or help alter topic behavior.

In accordance with at least one embodiment of the invention, it is recognized that the influence of a topic can be measured based on the variation in the importance of the topic over a time period, and the variation in the sentiment of the topic on a time scale. Influence can also be measured as a function of geography, e.g., as to whether a topic may be influential over a small or broad geographical extent, or how (or whether) topic influence might have changed over an areas as a function of time.

Further in accordance with at least one embodiment of the invention, it is recognized that topic influence can be measured as a function of "influencers". Particularly, this would be related to individuals or groups that prove most influential for a given topic; e.g., for sports this might be a sports commentator or a player while for politics it might be a politician or political analyst. Certain media may also be recognized as having more influence at given times; e.g., during presidential elections certain newspapers may be considered to be more influential. It is also recognized that measures may be available for aiming to affect topic influence, such as planting new stories; discerned variation before and after the measure is taken can help indicate how the measure has altered the topic's influence.

FIG. 1 schematically illustrates a high-level flow of a technique in accordance with at least one embodiment of the invention. As shown, a social data aggregator 101 can pursue two paths. In a first path, a topic importance graph and topic sentiment graph are calculated (103) (see also FIG. 2). Participants in microblogs are discovered (105), and a most-affected (topic) area from micro blocs is identified (107). In a second path, relevant web pages on a topic are obtained (109) and then a rank for each URL is calculated based on reach (111). Such calculations can be based on, among other things: traffic to the site that is identified (with a global and local rank determined, along with a country identified); an identification of whether a URL corresponds to a blog or news site, and/or to a news site with a daily (e.g., paper) edition); if the URL has a daily edition, roughly calculate parameters (e.g., circulation) with respect to that edition that would help indicate reach through the daily edition; a number of comments made for a URL; and an identification of whether the focus of a website (URL) is within the affected topic area obtained from a microblog. The paths then converge such that, based on insight obtained from a microblog and/or web pages, a user will be able to plant stories on the topic in different media and thereupon measure the topic importance graph and topic sentiment graph in a manner to identify significant alterations on the planted stories (113).

Figure 2:
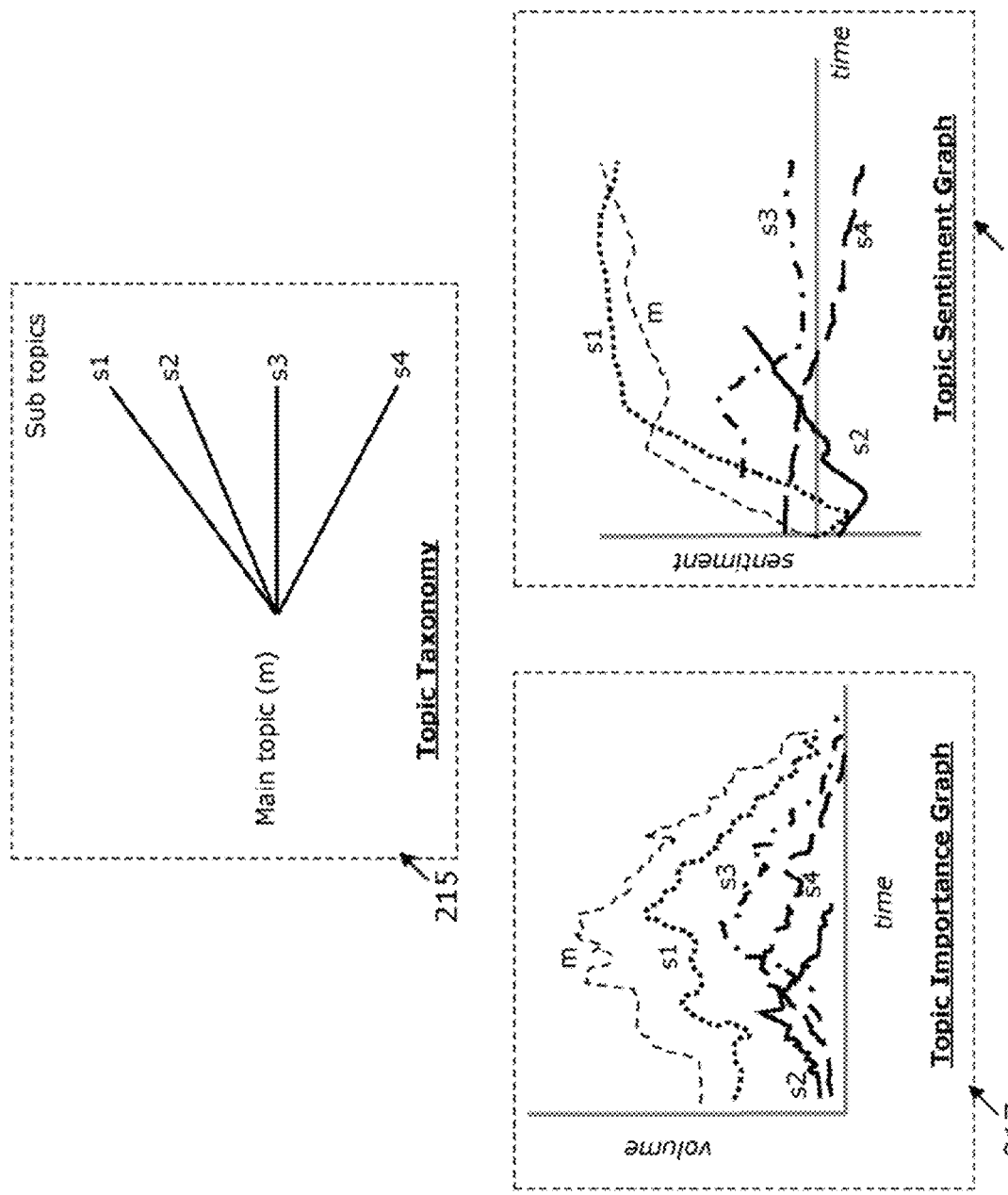
FIG. 2 schematically sets forth considerations in connection with measuring the importance and sentiments of topics.

FIG. 2 schematically sets forth considerations in connection with measuring the importance and sentiments of topics. As shown, a topic taxonomy 215 can serve to divide a main topic into several sub-topics. Particularly, by way of an illustrative example, several topics might be discussed via social media, and each of the topics may have several sub-topics that can be discovered using standard TF-IDF (term frequency-inverse document frequency) techniques or topic models. The importance of each topic/sub-topic can then be measured based on volume, and public sentiment with regard to each topic/sub-topic can also be determined.

More particularly, in accordance with at least one embodiment of the invention, a topic taxonomy 215 relates to breaking up topics into a hierarchy of subtopics. The topic importance graph (TIG) 217 shows how the importance of a topic changes over time, and the topic sentiment graph (TSG) 219 shows how the sentiment on a topic changes over time. The top K topic influencers are indicative of the influence score of users for a topic, while a region area chart shows regions where a topic is effected.

Figure 3:
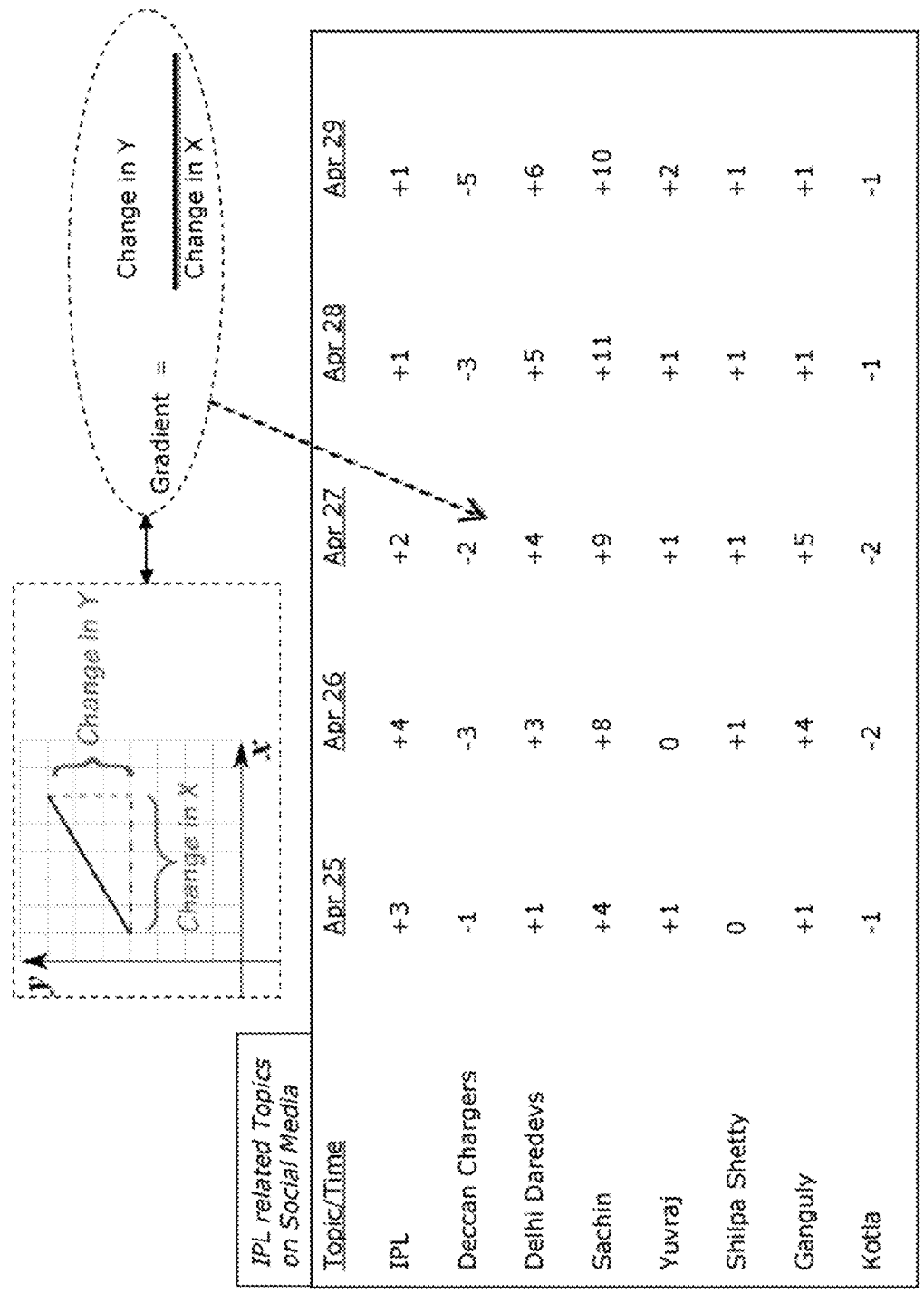
FIG. 3 schematically illustrates a concept of gradients for TIGs (topic importance graphs) and TSGs (topic sentiment graphs).

FIG. 3 schematically illustrates a concept of gradients for TIGs and TSGs, in accordance with at least one embodiment of the invention, with relation to the IPL (Indian Professional [Cricket] League). Here, it can be appreciated that the gradient of the Topic Importance Graph and Topic Sentiment Graph is an indication of how fast a topic is gaining in importance or popularity. A positive gradient indicates that there is a rise in the topic's importance/popularity, whereas a negative gradient indicates that there is a fall.

In accordance with at least one embodiment of the invention, spatial information derived from data streams can be added to generate topic focused spatio-temporal graphs. With zoom-in functionality, the following can be discovered: strong local topics vs. global topics, local topics which go global, and global topics which become strong locally. Generally, spatial information helps in targeting certain regions for marketing and advertising campaigns.

By way of an illustrative example in accordance with at least one embodiment of the invention, a city administration can continually monitor sentiment on topics of relevance to citizens (e.g., commuting time, public transport services, public conveniences at train stations, etc.). It can determine concerns for citizens, for example, by observing that people in one city district are continually complaining about public transport services and wherein the sentiment on this is very negative. The city administration can then introduce a new bus service to this city district. After the introduction of the new service, the city administration can continue to monitor public sentiment on the topic and a positive upswing can show that the measure taken by the city administration had a positive impact.

Figure 4:
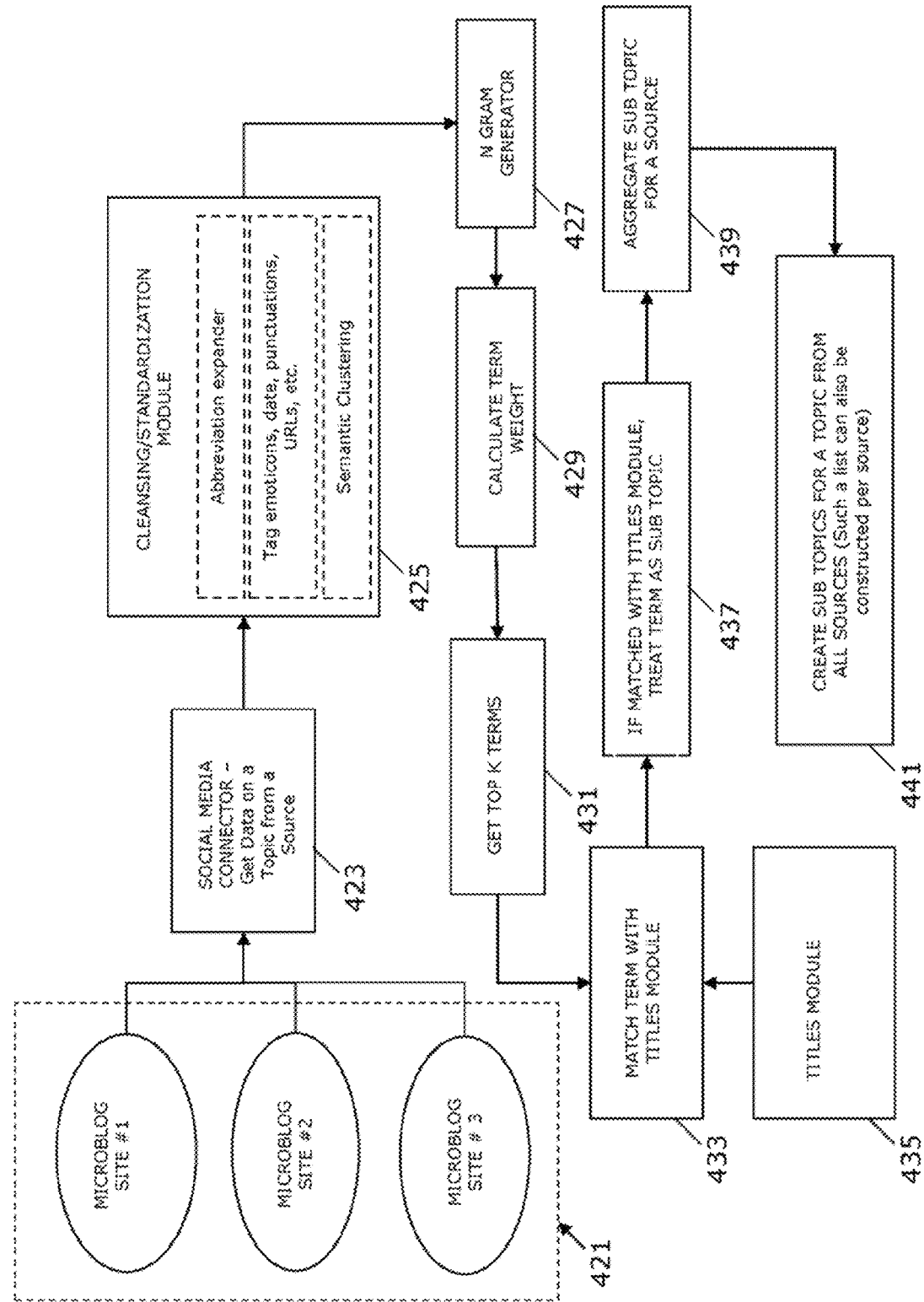
FIG. 4 schematically illustrates a process of generating a list of important topics and sub-topics from microblogs.

FIG. 4 schematically illustrates a process of generating a list of important topics and sub-topics from microblogs, in accordance with at least one embodiment of the invention. As such, from a number of microblog sites 421, a social media connector 423 obtains data on a topic. A cleansing/standardization module 425 accepts the language from microblogs and, e.g., discerns abbreviations based on different conventions, assimilates, parses and (if needed) deletes emoticons and other superfluous information, and undertakes semantic clustering. After N-grams are generated (427), the weight of different terms is calculated (429) and the top K terms obtained (431). These terms are matched (433) with titles from a titles module 435 and, in the event of a match, a term is treated as a subtopic (437). Subtopics are aggregated for one given media source (439), and then are aggregated with respect to a main topic on behalf of all sources (441), while such a list can also be constructed with respect to each source.

Figure 5:
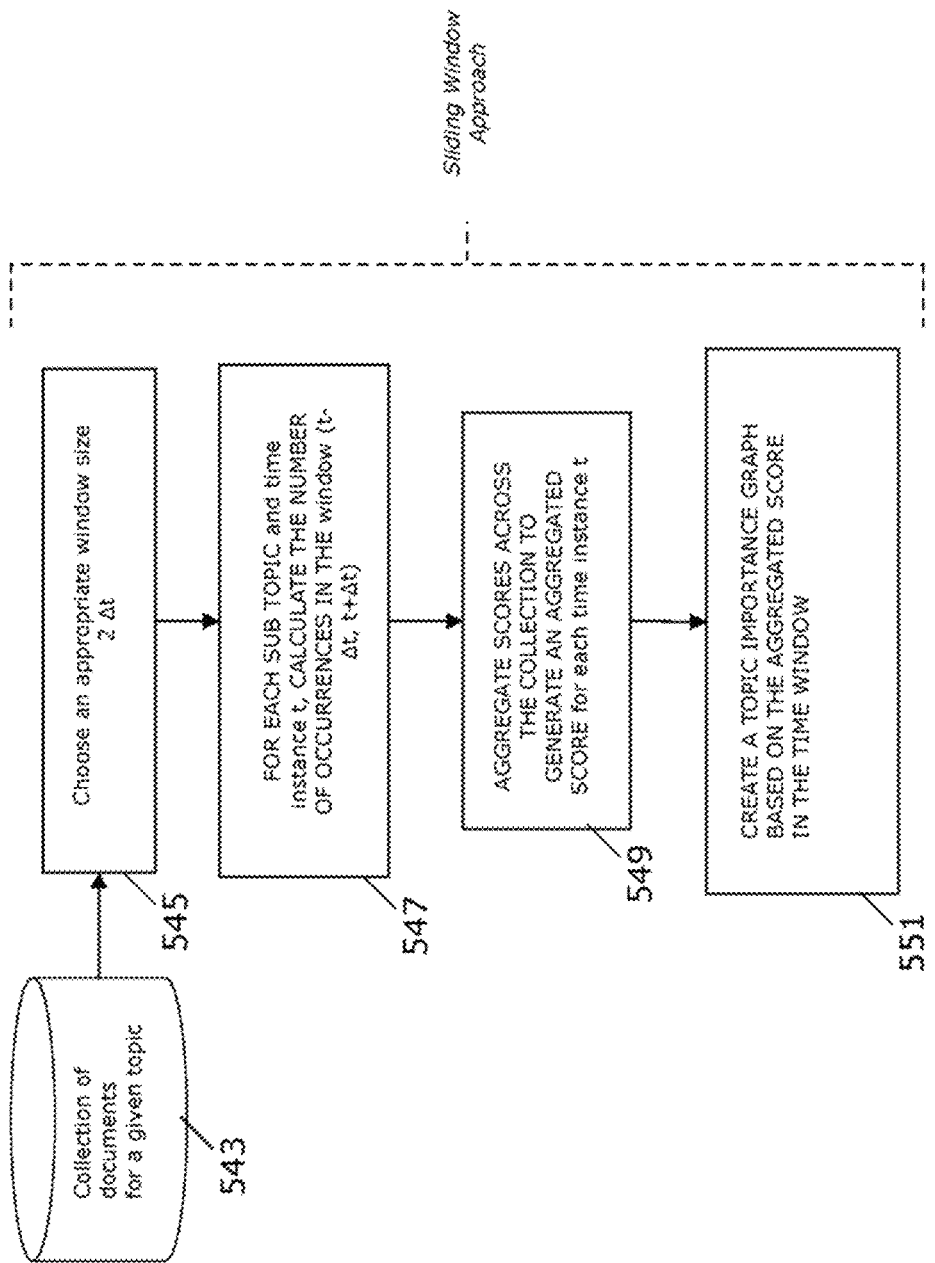
FIG. 5 schematically illustrates a process of generating a topic importance graph from microblogs.

FIG. 5 schematically illustrates a process of generating a topic importance graph from microblogs, in accordance with at least one embodiment of the invention. Here, there is illustrated a sliding window approach. Starting with a collection of documents for a given topic (543), a window size is first chosen, corresponding to a quantity 2 Δt (545). For each subtopic and time instance t, the number of occurrences of the subtopic is calculated with respect to the window (t−Δt, t+Δt) (547). Importance scores are calculated across the collection of documents in use to yield an aggregated score for each time instance t (549), and a TIG is created on the basis of the aggregates score with respect to a time window (551).

Figure 6:
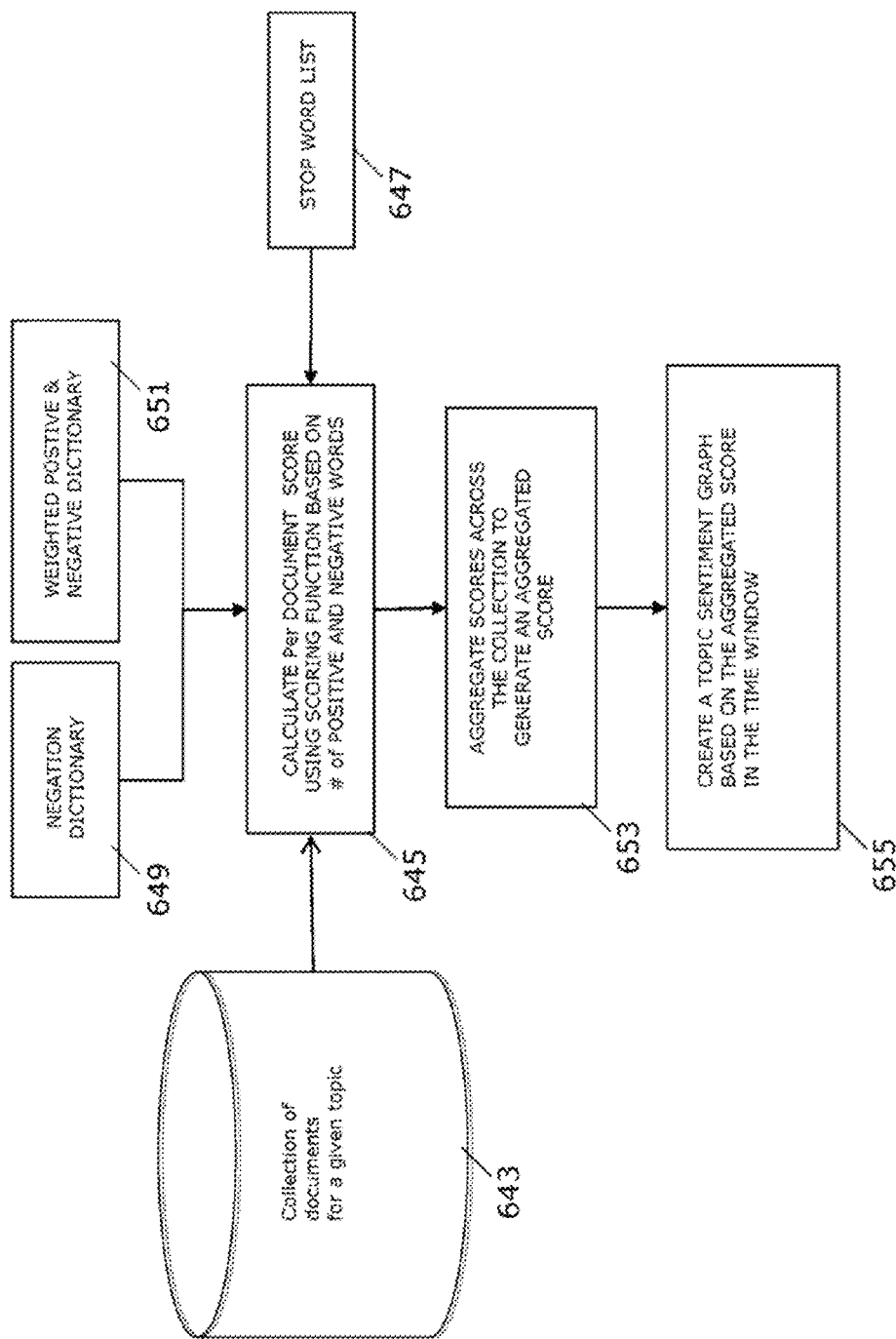
FIG. 6 schematically illustrates a process of generating a topic sentiment graph with respect to microblogs.

FIG. 6 schematically illustrates a process of generating a topic sentiment graph with respect to microblogs, in accordance with at least one embodiment of the invention. Given a collection of documents for a topic (643), a per-document score is calculated based on a scoring function related to a number of positive and negative words (645). In other words, "positive" words relate directly to a topic and "negative" words relate to a topic that is distinctly different with respect to a topic. Input to this step may include a stop word list 647, a negation dictionary 649 and a weighted positive and negative dictionary 651. (The weighted positive and negative dictionary 651, for its part, would contain terms that relate to a topic and are weighted with respect to closeness to the topic ["positive" terms] and also terms that are unrelated to a topic and are thereby weighted with respect to distance from, or lack of closeness with respect to, the topic ["negative" terms].) Scores are aggregated across the collection of documents to generate an aggregated score with respect to individual topics (653), and a TSG is thereupon created with respect to a time window (655).

Figure 7:
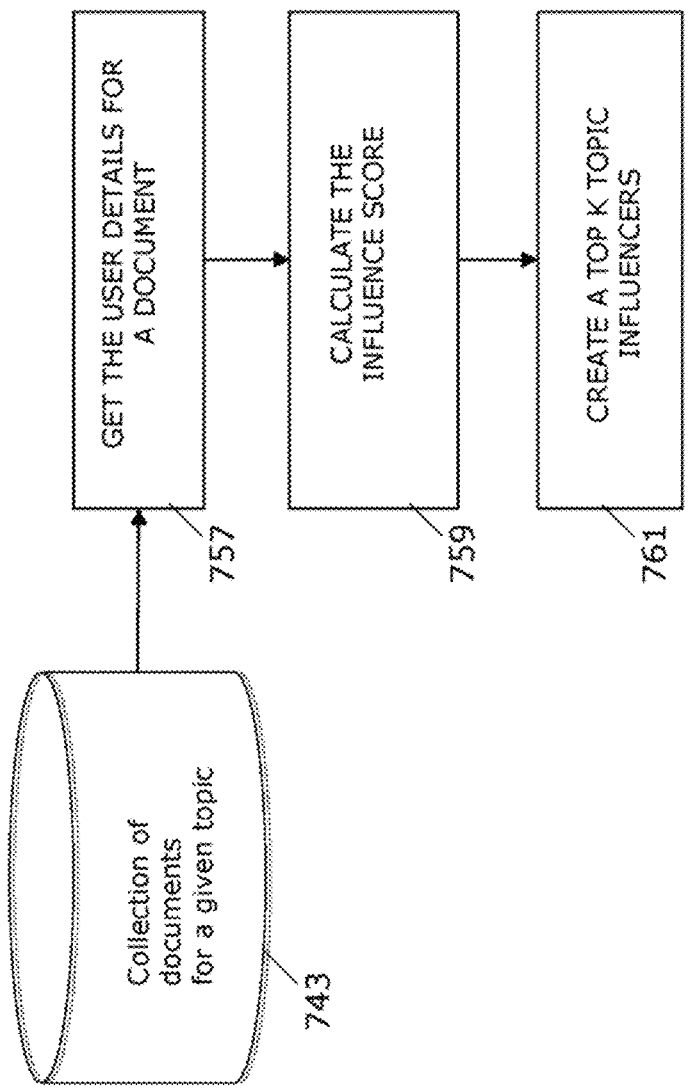
FIG. 7 schematically illustrates a process of generating a set of top K-topic influencers on microblogs.

FIG. 7 schematically illustrates a process of generating a set of top K topic influencers on microblogs, in accordance with at least one embodiment of the invention. Given a collection of documents for a topic (743), microblog user details for a document are obtained (757). An influence score is calculated for a microblog user (759), and a top K list of topic influencers is created (761).

Figure 8:
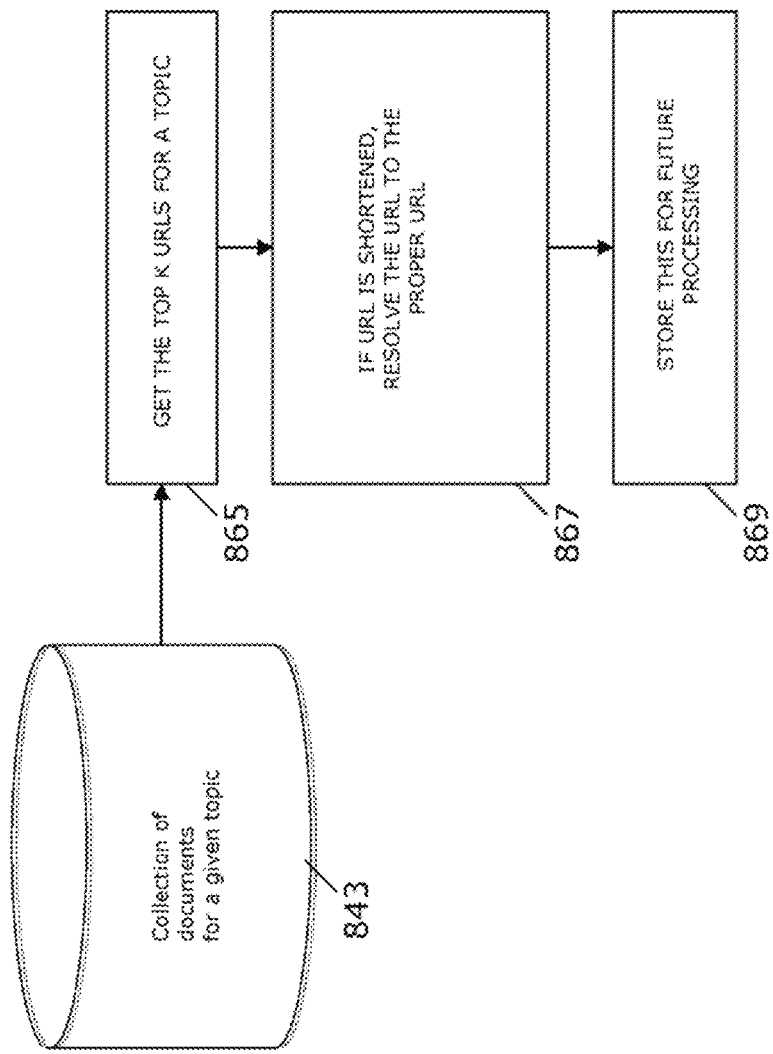
FIG. 8 schematically illustrates a process of generating a set of top K-URLs on microblogs.

FIG. 8 schematically illustrates a process of generating a set of top K-URLs on microblogs, in accordance with at least one embodiment of the invention. As such, from a collection of documents (843), a set of top K URLs is obtained (865). If the URL is a shortened one, it is resolved to a proper URL (867); the originally harvested and/or resolved URL are then stored for future processing (869).

Figure 9:
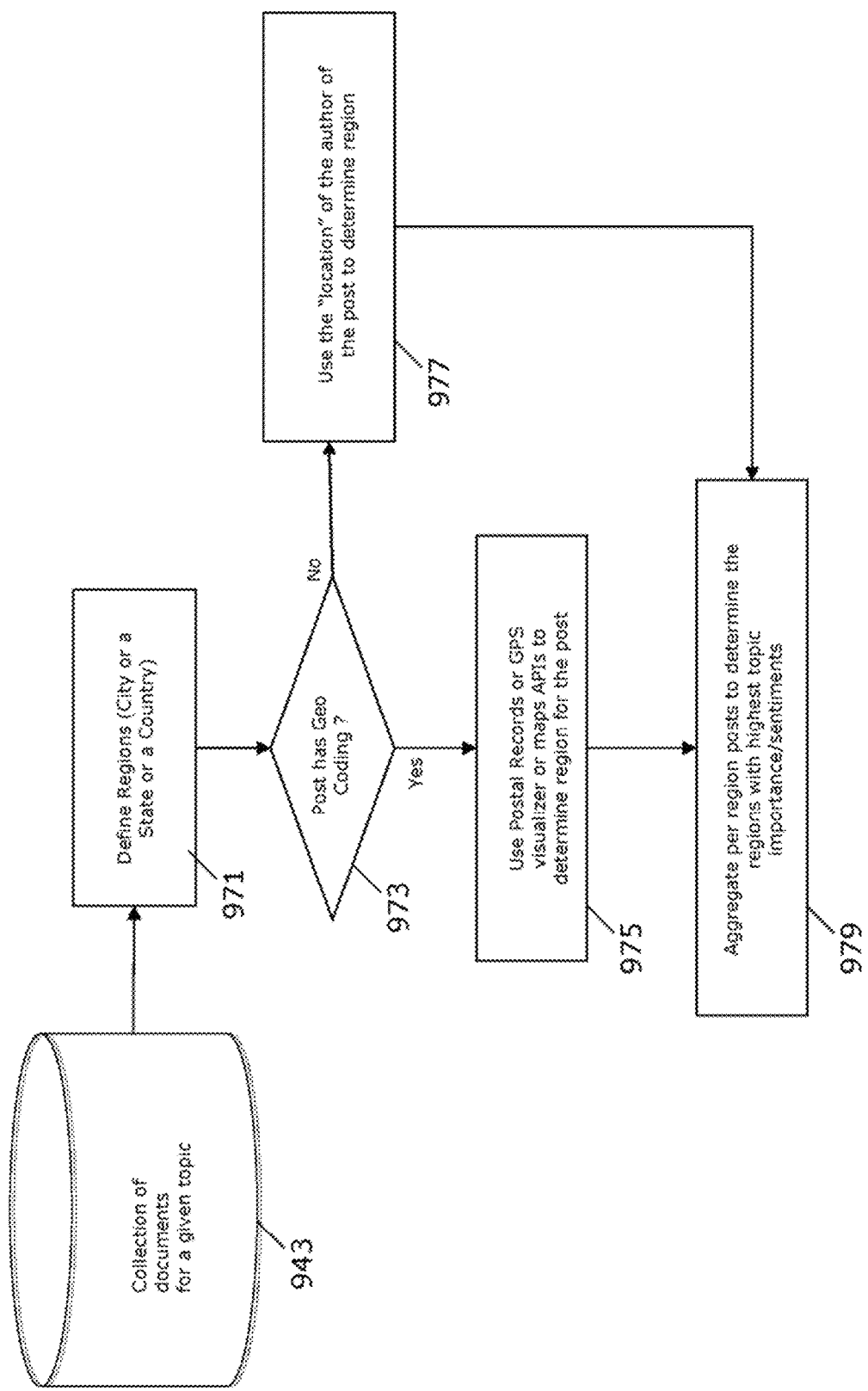
FIG. 9 schematically illustrates a process of classifying documents on microblogs based on demographic details (e.g., to obtain a "most effective" region).

FIG. 9 schematically illustrates a process of classifying documents on microblogs based on demographic details (e.g., to obtain a "most effective" region), in accordance with at least one embodiment of the invention. As such, based on a collection of documents for a given topic (943), regions are defined (e.g., city, state or country) (971) and then a check is made as to whether a post has geo coding (973). If yes, then postal records or a visualizer or mapping APIs are used to determine a region for the post (975). If no, a stated location of the author is used to determine the region (at least provisionally) (977). In either case posts per region are aggregated to determine those regions with a higher or highest topic importance or topic sentiment value (979).

Figure 10:
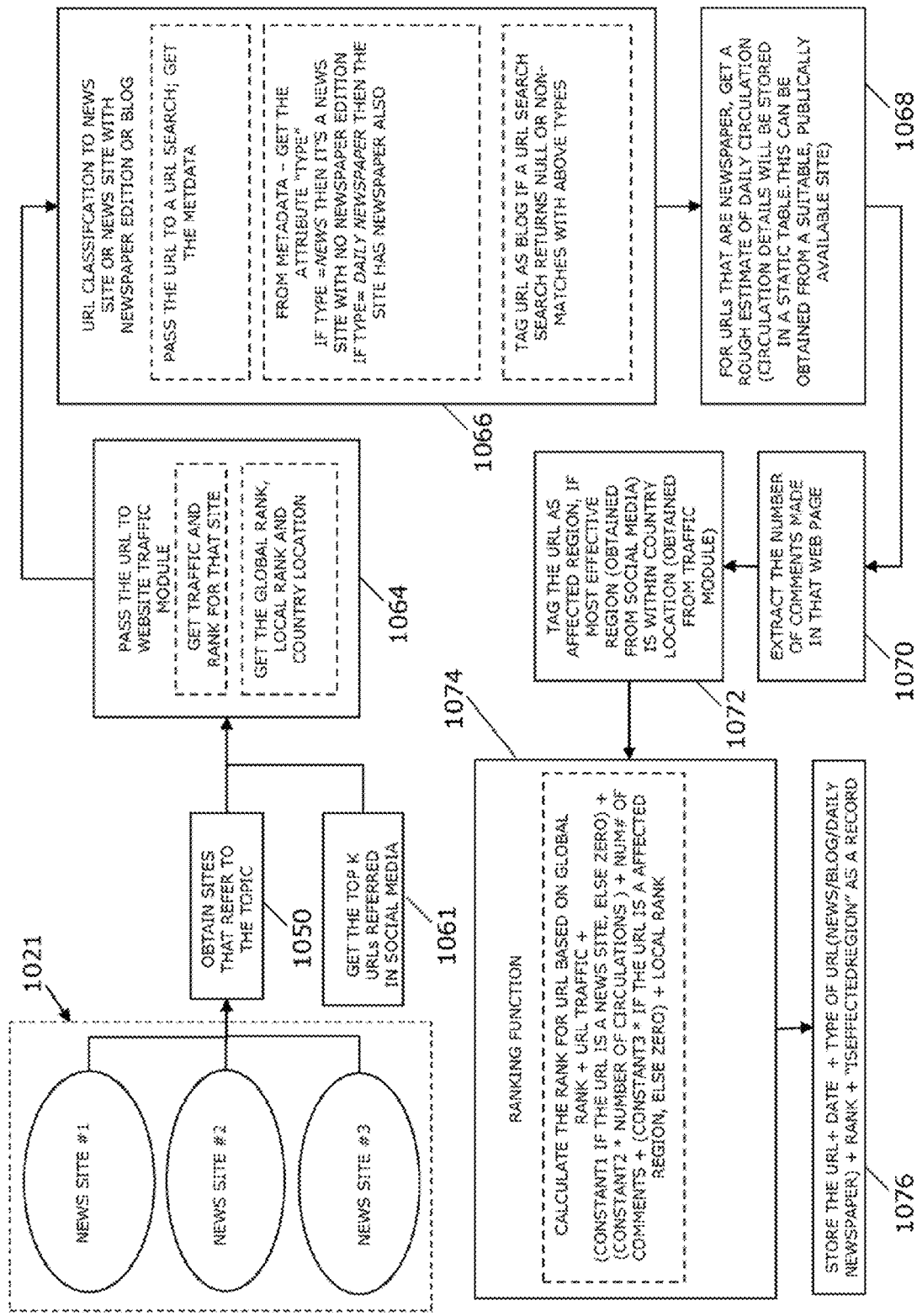
FIG. 10 schematically illustrates a process of identifying the reach of a website (e.g., by classifying it as a "news site" or "news site+newspaper or blog"), and calculating the rank for the site.

FIG. 10 schematically illustrates a process of identifying the reach of a website (e.g., by classifying it as a "news site" or "news site +newspaper or blog"), and calculating the rank for the site, in accordance with at least one embodiment of the invention. Accordingly, to calculate the rank of a URL, in accordance with at least one embodiment of the invention, one can represent each URL as a feature vector with the following dimensions:

1) Global rank
2) Local rank
3) URL traffic
4) Assign 1 if the URL is a news site, else zero
5) Circulation quantity
6) Number of comments
7) Sensation index (in terms of the type of "hype" the URL creates historically)
8) Assign 1 if the URL is an affected region, else zero Region-specific domain knowledge can be employed, e.g., that one newspaper is more popular in one region (e.g. "The Hindu" in southern India) as is another in another region (e.g., the "TOI" ["Times of India"] in northern India), to manually rank a few popular URLs. The ranking and its contributing components can be used as a training set to train standard machine learning ranking methods and use it to predict rank of the remaining URLs.

As such, in accordance with at least one embodiment of the invention, and as shown in FIG. 10, with respect to a given topic, several news sites (1021) are obtained (1050) that refer to the topic. Along with top K news site URLs referred to in social media (e.g., as obtained via one or more processes as broadly contemplated herein) (1052), URLs are referred to a website traffic module (1064), whereupon traffic and a relative rank with respect to that site are obtained along with a corresponding global rank, local rank and country location.

Next, by way of obtaining a URL-related classification (1066) a URL is passed to a URL search engine and metadata are obtained, including the "type" of news site involved. If the type is determined to be "news", then it can be discerned that the URL corresponds to a news site with no daily newspaper (print) edition. If the type is determined to be "daily newspaper", then the URL can be deemed to correspond to a news site with a daily newspaper edition. Should neither of these types correspond to a URL, then the URL can be tagged as a blog.

In accordance with at least one embodiment of the invention, for URLs that correspond to a newspaper, a rough estimate of daily circulation can be obtained, e.g., as may be found in a static table in a publically available website (1068). The number of comments made on that URL page is extracted (1070) and the URL is tagged as an "affected region", if a most effective region obtained from social media is within the country location already obtained (1072). A ranking function can then be applied (1074), and information relating to the URL, date and other information, can then be stored (1076), all as shown in FIG. 10.

Figure 11:
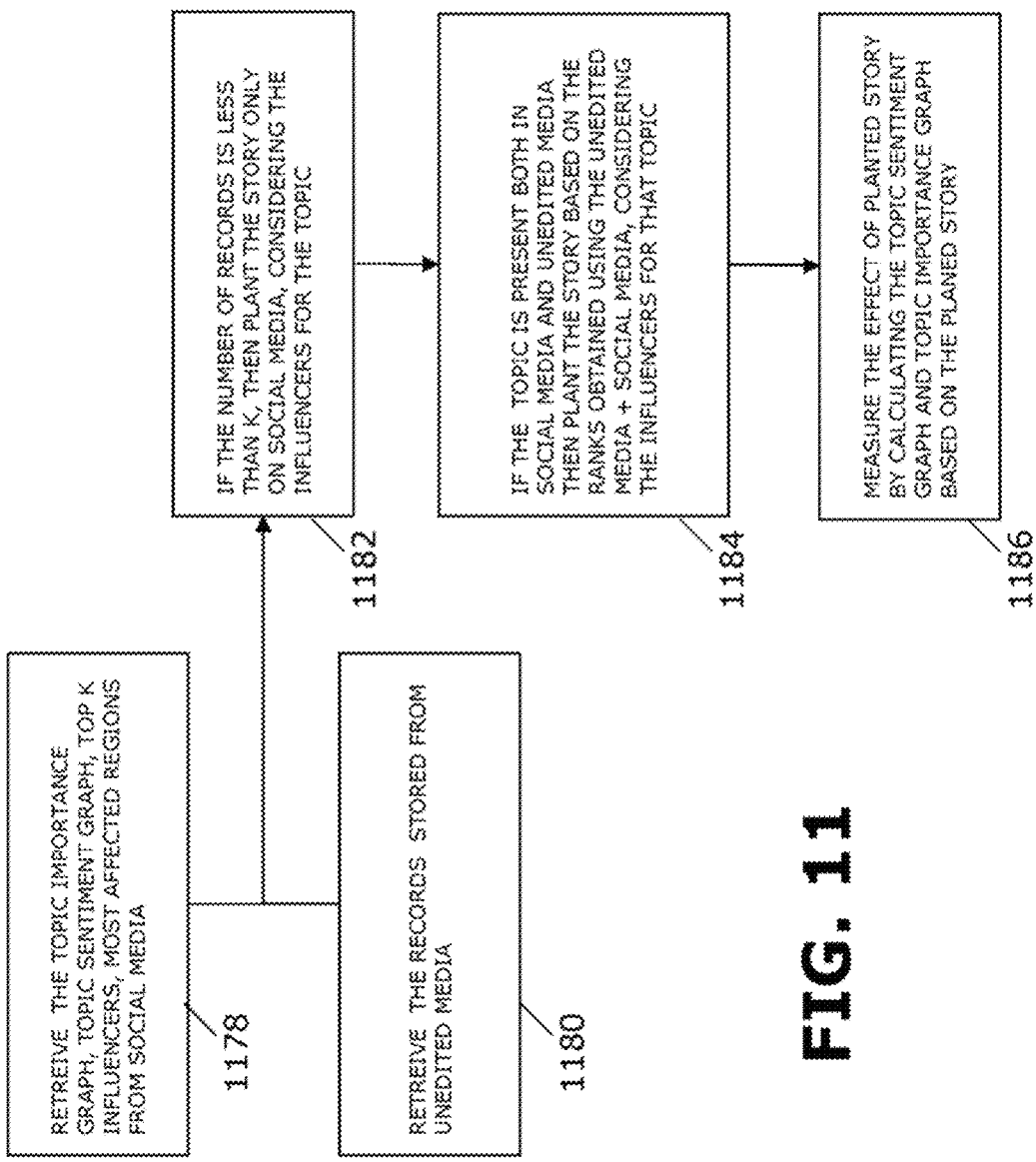
FIG. 11 schematically illustrates a process of planting a story on a topic.

FIG. 11 schematically illustrates a process of planting a story on a topic, in accordance with at least one embodiment of the invention, utilizing information from other processes as broadly discussed and contemplated herein. A TIG, TSG, top K influencers, and most affected regions from social media are obtained as input information (1178), along with records stored from unedited media (1180), all with respect to a given story. If the number of records is less than K, then the story may be planted solely with respect to social media (while considering top influencers for the topic) (1182). If the topic is present both in social media and unedited media, the story may be planted based on ranks obtained on the basis of unedited media and social media (also, considering top influencers for the topic) (1184). The effect of the planted story may then be measured by calculating a TSG and TIG based on the planted story (1186).

The disclosure now turns to a recapitulation of various features associated with at least one embodiment of the invention; reference may continue to be made to any and all of FIGS. 1-11 as warranted. Generally, by way of a method in accordance with at least one embodiment of the invention, all the posts on a given topic (e.g., lokpal) are collected from micro blogging sites by using a set of keywords. The significant sub-topics are found (e.g., some methods for doing this can be TF-IDF based selection, topic models using a resource such as "Wikipedia", parts of speech tag based selection of nouns and verbs, etc.). For each sub-topic, a measurement is made of the number of times it occurs in a given time period and the gradient is computed at different intervals (Topic Importance Graph). For each sub-topic, a measurement is made of the sentiment of each tweet and the aggregate score is computed across all the posts in which it is mentioned in a given period of time, and the gradient is computed at different intervals (Topic Sentiment Graph).

In accordance with at least one embodiment of the invention, there is then undertaken an extraction of the top K influencers for these posts for that topic. The influencer score can be a "Klout Score" or Friends-Followers ratio or a function of re-posts or general count, among other things. There follows an extraction of the top K URLs referred in posts. If the URL is shortened, then it should be expanded. The expansion can be done by connecting to URL using HTTP Calls, and for a shortened URL the response code will be REDIRECT. These URLs will be used in future processing. Inasmuch as the post will have an attribute of location or place, this will be used to identify the region where it is most effective. Based on geo code or other location details, the system will calculate the most effective country or region. At this point, the system will have received insights with respect to microblogs such as (among others): which people are talking about the topic; what the sentiment is for discussed sub-topics; who all are active and influencing users; and a region that is most effected.

In accordance with at least one embodiment of the invention, all the web pages relevant to a topic (e.g., lokpal) are obtained by using a set of keywords. These webpages can be blogs or news sites (e.g., "Times of India", "Hindu", "New York Times"). Essentially any suitable social media aggregators may be used. There is then undertaken a filtering (e.g., using TF-IDF based selection) on these pages to extract pages that are more relevant. Included is the URL obtained from microblog processing, as well. The URL is passed to the website traffic module, and this module will process the URL and get Global Rank, Country/Location where it is registered and Local location rank. Essentially any suitable conventional medium may be employed for obtaining traffic details and the rank of a URL.

In accordance with at least one embodiment of the invention, there is undertaken a classification of a URL into blogs or news sites, or news sites that have a daily (paper) edition also. The metadata are searched with the URL (e.g., via "Wikipedia"), and metadata are obtained that match with an "official website" attribute. If the attribute "Type" in metadata has a value "News", then the URL is tagged as a news site with no newspaper edition. If the attribute "Type" in the metadata has the value "daily newspaper," then the URL is tagged as a News site with a newspaper edition also. If there is no entry, or Type is different, then the URL is tagged as a blog. This classification helps in understanding the relevance of the site. If it is a blog, for instance, then it can be understood as having less public reach than a news site. If a URL has a news site and a daily edition, it can be understood as having more public reach than solely a news site (without a corresponding daily paper edition).

In accordance with at least one embodiment of the invention, for a URL tagged as a newspaper with a news edition also, one can get a rough estimate of daily circulation, e.g., via a static table lookup. By way of example, one can build these tables using http://en.wikipedia.org/wiki/List_of_newspapers_in_the_World_by_circulation or http://en.wikipedia~DOT~org/wiki/List_of_newspapers_in_India_by_circulation, etc. There is then an extraction of the number of comments made in that URL. The URL is tagged as an affected region, if the location obtained from micro blogs is within the country location obtained from a website traffic module.

In accordance with at least one embodiment of the invention, it can be appreciated that the above steps essentially calculate the reach for a URL on a topic. For instance, consider the blog "abt lokpal". The page "abt lokpal" in word Press will have lesser reach compared to "lokpal news" reported by a high-profile mainstream news site. The URL "timesofindia" will have more reach than a high-profile mainstream news site in the effected region since it has a daily edition in that region. Based on the traffic calculation, the URL "theHindu" will have more reach than "timesofindia", since the local rank for timesOfIndia is 247 and local rank for theHindu is 149.

In accordance with at least one embodiment of the invention, the rank for a URL is calculated based on the following extracted entities:

GLOBAL RANK
URL TRAFFIC
(CONSTANT1 IF THE URL IS A NEWS SITE, ELSE ZERO)
(CONSTANT2*CIRCULATION NUMBER)
NUM# OF COMMENTS
(CONSTANT3*IF THE URL IS A AFFECTED REGION, ELSE ZERO)
LOCAL RANK

This rank will provide the reach for a URL. If the topic is discussed more on microblogs but less in news media, then the user can plant the story on microblogs. The user can accordingly also influence the people who are influencers for that topic. If the topic is discussed on microblogs and news media both, then the user can plant the story in both media. In a news site, he/she can invest more time with respect to the participants that have top ranks, so that it will reach maximum people and create a maximum impact. The effect of a planted story can be measured by observing the Topic Importance Graph and the Topic Sentiment Graph of the topics for which there is a desire to influence, to determine whether any significant alteration has occurred as a result of the planted stories.

Figure 12:
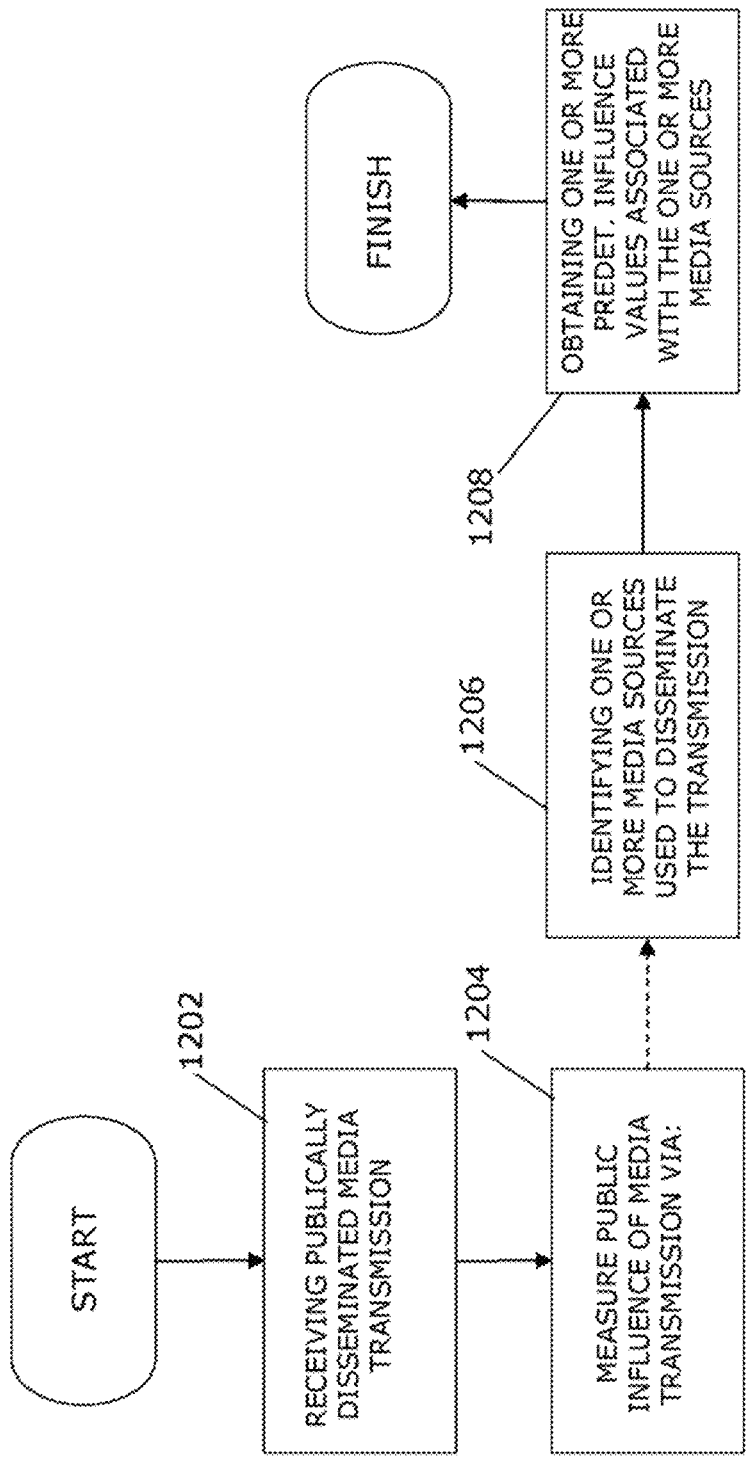
FIG. 12 sets forth a process more generally for measuring and utilizing media topic influence.

FIG. 12 sets forth a process more generally for measuring and utilizing media topic influence, in accordance with at least one embodiment of the invention. It should be appreciated that a process such as that broadly illustrated in FIG. 12 can be carried out on essentially any suitable computer system or set of computer systems, which may, by way of an illustrative and non-restrictive example, include a system such as that indicated at 12' in FIG. 13. In accordance with an example embodiment, most if not all of the process steps discussed with respect to FIG. 12 can be performed by way of a processing unit or units and system memory such as those indicated, respectively, at 16' and 28' in FIG. 13.

As shown in FIG. 12, in accordance with at least one embodiment of the invention, a publically disseminated media transmission is received (1202). Public influence of the media transmission is measured (1204) via: identifying one or more media sources used to disseminate the media transmission (1206); and obtaining one or more predetermined influence values associated with the one or more media sources (1208).

Figure 13:
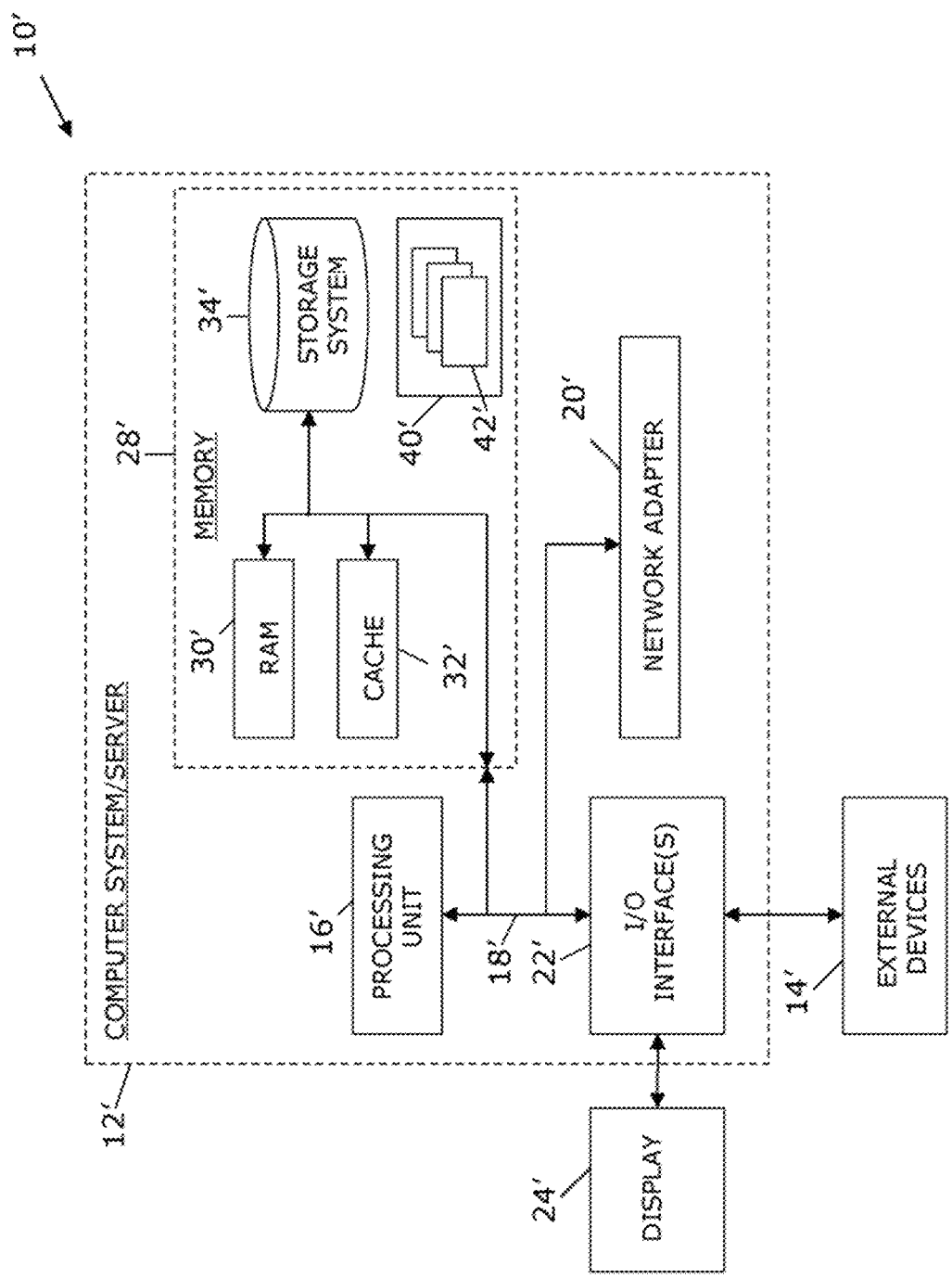
FIG. 13 illustrates a computer system.

Referring now to FIG. 13, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method for measuring and altering media topic influence, said method comprising:
   utilizing a processor to execute computer code configured to perform the steps of:
   receiving a publicly disseminated media transmission; and measuring general public influence of the media transmission via:

identifying one or more media sources used to disseminate the media transmission;

said identifying comprising identifying a topic associated with the media transmission, and determining subtopics related to the topic;

obtaining one or more predetermined influence values associated with the topic and subtopics;

said obtaining comprising measuring influence with respect to media sources employed in disseminating the topic, and thereupon ranking the media sources; and automatically determining at least one aspect of a story planting strategy based on the measured influence of the topic and subtopics, and on the ranking of the media sources, towards affecting general public influence of the topic and subtopics;

wherein said ranking is based on a relative importance of a medium in disseminating the topic with respect to a predetermined geographical region.

2. The method according to claim 1, wherein said ranking comprises ranking additionally on the basis of at least one of: local influence, global influence, circulation, received comments, traffic at a media source.

3. The method according to claim 1, wherein said obtaining comprises measuring influence with respect to at least one parameter of the media transmission selected from the group consisting of: time, geographical reach, and medium of transmission.

4. The method according to claim 1, wherein the media transmission comprises one or more of: a news media transmission, and a microblog transmission.

5. The method according to claim 4, wherein said calculating comprises employing at least one of: a negation dictionary, and a weighted positive-negative dictionary.

6. The method according to claim 1, wherein said obtaining comprises calculating at least one of: a number of positive words; and a number of negative words.

7. An apparatus comprising:

at least one processor; and a computer readable storage medium having computer readable program code embodied therewith and executable by the at least one processor, the computer readable program code comprising:

computer readable program code configured to receive a publicly disseminated media transmission; and computer readable program code configured to measure general public influence of the media transmission via:

identifying one or more media sources used to disseminate the media transmission;

said identifying comprising identifying a topic associated with the media transmission, and determining subtopics related to the topic;

obtaining one or more predetermined influence values associated with the topic and subtopics;

said obtaining comprising measuring influence with respect to media sources employed in disseminating the topic, and thereupon ranking the media sources; and automatically determining at least one aspect of a story planting strategy based on the measured influence of the topic and subtopics, and on the ranking of the media sources, towards affecting general public influence of the topic and subtopics;

wherein the ranking is based on a relative importance of a medium in disseminating the topic with respect to a predetermined geographical region.

8. A computer program product comprising:

a non-transitory computer readable storage medium having computer readable program code embodied therewith, the computer readable program code comprising:

computer readable program code configured to receive a publicly disseminated media transmission; and computer readable program code configured to measure general public influence of the media transmission via:

identifying one or more media sources used to disseminate the media transmission;

said identifying comprising identifying a topic associated with the media transmission, and determining subtopics related to the topic;

obtaining one or more predetermined influence values associated with the topic and subtopics;

said obtaining comprising measuring influence with respect to media sources employed in disseminating the topic, and thereupon ranking the media sources; and automatically determining at least one aspect of a story planting strategy based on the measured influence of the topic and subtopics, and on the ranking of the media sources, towards affecting general public influence of the topic and subtopics;

wherein the ranking is based on a relative importance of a medium in disseminating the topic with respect to a predetermined geographical region.

9. The computer program product according to claim 8, wherein said computer readable program code is configured to rank additionally on the basis of at least one of: local influence, global influence, circulation, received comments, and traffic at a media source.

10. The computer program product according to claim 8, wherein said computer readable program code is configured to measure influence with respect to at least one parameter of the media transmission selected from the group consisting of: time, geographical reach, and medium of transmission.

11. The computer program product according to claim 8, wherein the media transmission comprises one or more of: a news media transmission, and a microblog transmission.

* * * * *